Figure 1:
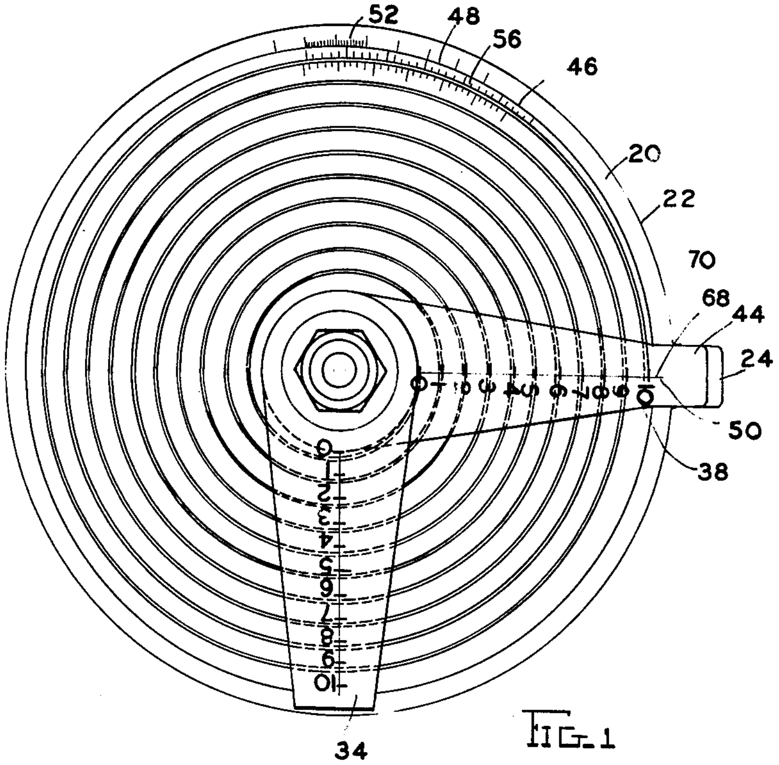

Aug. 24, 1965 P. M. PEPPER 3,202,352

SLIDE RULE

Filed July 29, 1963

2 Sheets-Sheet 1

INVENTOR.
PAUL M. PEPPER

BY Anthony D. Cennamo

SLIDE RULE

Filed July 29, 1963

2 Sheets-Sheet 2

*INVENTOR.*
PAUL M. PEPPER
*BY*
Anthony D. Cennamo

United States Patent Office 3,202,352
Patented Aug. 24, 1965

3,202,352
SLIDE RULE

Paul M. Pepper, 185 Rustic Place, Columbus 14, Ohio

Filed July 29, 1963, Ser. No. 298,227
8 Claims. (Cl. 235—83)

This invention relates to improvements in calculating devices of the slide rule type and particularly to providing scales for a slide rule that extends its utility, accuracy and greatly simplifies the computation performed thereon.

There is disclosed in my Patent No. 2,564,227, a slide rule capable of making computations accurate to five significant figures. The rule shown in that patent is of the circular type and has as one of its primary scales a ten convolution spiral on which is laid out a logarithmic scale. This scale is divided by the secondary logarithmic graduations into an equal number of divisions which are ten in number or some multiple or sub-multiple of ten. A second scale is a ten convolution spiral logarithmic sine scale. This second scale pertains to sines of angles in the range from 90° to approximately 5.75°. A third scale is a ten convolution spiral logarithmic tangent scale and pertains to tangents of angles in the range from 45° to approximately 5.75°. For the operations intended and in these ranges these scales and rule performed as expected. It can be seen, however, that for computations involving the sine or tangent of an angle below 5.75°, approximately ten additional convolutions of the appropriate scale are required to get down to 0.575°. Beyond this point, the radian measure can be used instead of the sine or tangent without significant loss of accuracy. To put the additional ten turns on the rule shown in that patent or on any other ten turn rule would require enlarging the size of the rule to unmanageable proportions. Alternatively, the additional ten turns may be placed on the reverse side of the rule to the exclusion of other useful scales. These additional ten turns would occupy essentially as much as the entire remaining ranges of angles; i.e., as much as for angles from 5.75° to 90° on the (logarithmic) sine scale and 5.75° to 45° on the (logarithmic) tangent scale. Providing a scale with the additional turns would have to be to the exclusion of such other quite utilitarian scales such as the reversed (logarithmic) number scale (the CI scale), the A scale (half-size cycle logarithmic number scale), the log scales, and the (logarithmic) hyperbolic sine and the cosine scales.

It is the purpose of the present invention to extend the logarithmic sine and tangent scales to zero degrees by scales which can be made in such a way that they together occupy a very small portion of the usable area and, in particular, a small portion of a single turn. In a preferred embodiment, these scales are graduated in degrees or halves of degrees from 10° to 0°.

It is well known that whenever the ratio of the values of two functions varies slowly throughout some range, the difference of the logarithms, being the logarithm of the ratio, will also, in most cases, vary slowly throughout that range. For instance, it is known that for angles between 5.75° and zero degrees, the sine of the angle divided by the angle in degrees is approximately $$\frac{\pi}{180}$$

also the value of this ratio gets closer to $$\frac{\pi}{180}$$

as the angle gets closer to zero. This led to my discovery that settings of the logarithm of one of these functions may be obtained from the settings of the other function by an extremely abbreviated scale laid out according to the differences of the logarithms of the functions. In this way, one complete scale of a first function for the range in question, together with an abbreviated differential scale for a second function in its desired range, are substituted for both complete scales of the two functions in their respective ranges.

It is accordingly a principal object of the present invention to provide a new and improved slide rule that performs computations not possible with the original slide rule.

It is another object to design an improved slide rule which provides computations to five significant figures over an extended range.

A further object of the present invention is to increase the utility of a slide rule to perform computations below 5.75° without appreciably adding to the physical dimensions or the usable area of the rule.

Another object of the present invention is to compute with values of one function from settings of another function on a slide rule without the necessity of providing a complete scale for the first function.

Figure 1A:
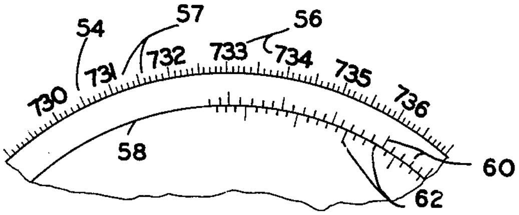
Figure 1B:
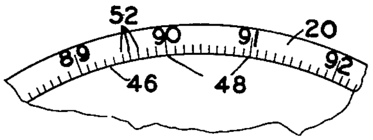
Figure 2:
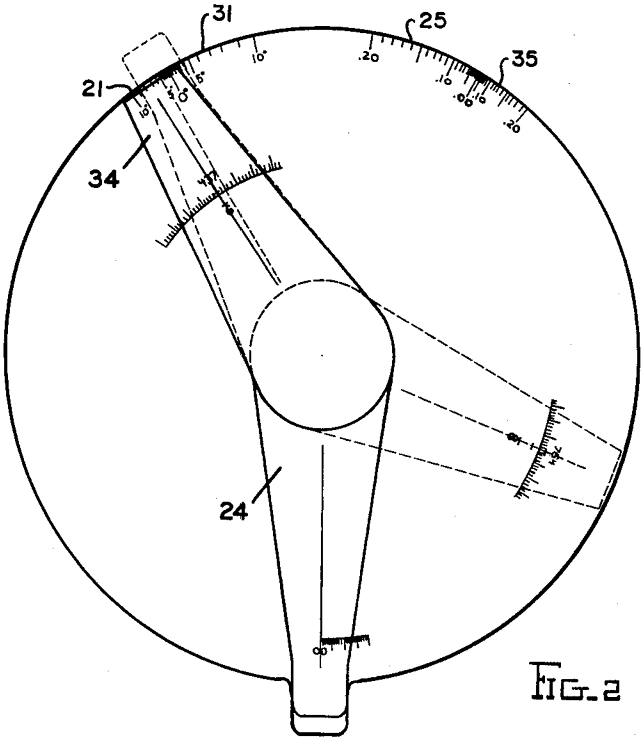
Figure 2A:
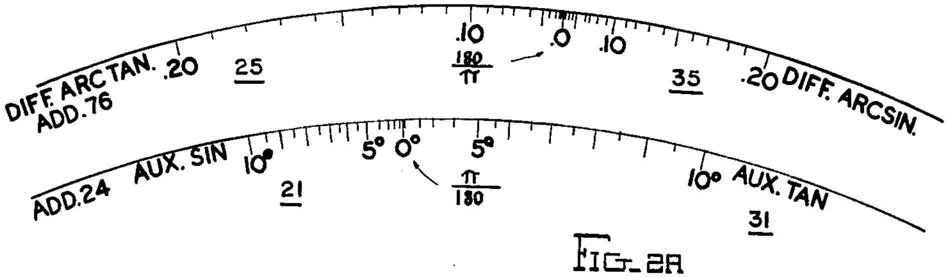
Figure 3:
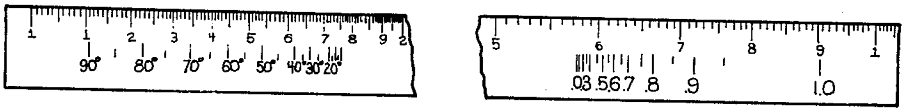

Other objects and features of the present invention will become apparent from the following detailed description when taken in conjunction with the drawings in which:

FIGURES 1, 1*a* and 1*b* are face views of an embodiment of a circular slide rule having a spiral logarithmic scale and a marginal annular scale;

FIGURES 2 and 2*a* are extensions of the embodiment of FIGURE 1 to include the features of the present invention; and, FIGURE 3 is another embodiment illustrating that the principles of the present invention are equally applicable to a straight slide rule.

Referring now to FIGURE 1, 1*a* and 1*b*, there is shown a circular slide rule substantially as that disclosed in my prior patent, supra. With reference thereto, disk 20 is provided with a marginal annular scale 46 divided by equispaced primary numbered graduations 48, the zero graduation 50 being on the same radius as the radial center of the tab 24. A plurality of secondary graduations 52 divide equally and preferably into ten equal spaces, the portion of the scale between adjacent primary graduations 48. A spiral (referred to as a helical in my prior patent) logarithmic scale 54 having ten convolutions occupies the major portion of the physical embodiment of the rule. The outer end of the spiral scale is spaced inwardly from the number scale 46 and the inner end is spaced outwardly from the center 40. The logarithmic scale 54 has its outer end radially aligned with the zero position 50 of the number scale 48.

The logarithmic number scale 54 is divided by suitably numbered primary scale divisions or graduations 56. The spaces between the primary numbered graduations 56 are divided by the secondary logarithmic graduations 57 into an equal number of divisions which are ten in number or some multiple or sub-multiple of ten.

A second spiral scale line 58 is juxtaposed to the scale 54 and preferably has the same number of convolutions although it may have more or fewer convolutions than scale 54. One side of this scale may be provided graduations 60 suitably numbered which constitute a sine-cosine logarithmic scale. At the opposite side of scale line 58 may be provided a second series of graduations 62 which will preferably comprise a tangent-cotangent logarithmic scale. The two sets of logarithmic scales 54, 58 are preferably arranged upon the disc, as illustrated in FIGURE 1.

Referring to FIGURE 2, there is illustrated one embodiment of the present invention as incorporated in the rule of FIGURE 1. Specifically, there is provided on this rule differential scales 21, 25, 31 and 35 to extend the (logarithmic sine and tangent scales to read with five significant figure accuracy of 0°. The principle in the design of these differential scales is, that for angles close to zero degrees, the sine of the angle is approximately $$\frac{\pi}{180}$$

times the number of degrees. Also, the value of the approximate ratio gets closer to $$\frac{\pi}{180}$$

as the angles get closer to zero. Moreover, the difference of the logarithms of the sine and the angle in degrees gets closer to the logarithm of $$\frac{\pi}{180}$$

That is, whenever the ratio of the values of two functions varies slowly throughout the range and does not approach zero, the difference of the logarithms, being the logarithm of the ratio, will also vary slowly throughout that range.

In this particular illustration, the differential scale 21 for giving the sine of the angles from 10° to 0° is found by $$\text{layout angle } \theta^\circ=\left(\log_{10}\frac{\sin x}{x^\circ}+1.80000\right)3600$$

wherein $\theta$ is the layout angle in degrees clockwise around the pivotal point measured from the registered hairline and $x^\circ$ is the graduation angle in degrees. Therefore, since $$\sin x=x^\circ\left(\frac{\sin x}{x^\circ}\right)\text{where }\frac{\sin x}{x^\circ}\text{ is near }\frac{\pi}{180}\left(\text{and less than }\frac{\pi}{180}\right)$$

the differential sin scale 21 is designed by finding and laying out the logarithms of these ratios for 10° to 1°, and the limiting value $$\log_{10}\frac{\pi}{180}\text{ for }0^\circ$$

| $x^\circ$ | $\theta^\circ$ |
|---|---|
| 0 | 150.76 |
| 1 | 150.67 |
| 2 | 150.44 |
| 3 | 150.04 |
| 4 | 149.49 |
| 5 | 148.77 |
| 5.5 | 148.36 |
| 6.0 | 147.90 |
| 6.5 | 147.40 |
| 7.0 | 146.87 |
| 7.5 | 146.29 |
| 8.0 | 145.67 |
| 8.5 | 145.02 |
| 9.0 | 144.32 |
| 9.5 | 143.59 |
| 10.0 | 142.81 |

In an identical manner, the tangent scale 31 is laid out for giving the tangent of the angles below 10° based on the principle that for angles close to 0° the tangent and the angle in radian measure have a ratio of approximately one, or when the number of degrees in angle is used, a ratio of approximately $$\frac{\pi}{180}$$

In this particular illustration, the differential scale 31 for giving the tangent of angles from 10° to 0° is found by $$\text{layout angle } \theta^\circ=\left(\log_{10}\frac{\tan x}{x^\circ}+1.80000\right)3600$$

Therefore, since $$\tan x=x^\circ\left(\frac{\tan x}{x^\circ}\right)\text{where }\frac{\tan x}{x^\circ}\text{ is near }\frac{\pi}{180}\left(\text{and greater than }\frac{\pi}{180}\right)$$

a differential tan scale can be designed by laying out the logarithms of these ratios for 10° to 1° and limiting value $$\frac{\pi}{180}$$

for 0°

| $x^\circ$ | $\theta^\circ$ |
|---|---|
| 0 | 150.76 |
| 1 | 150.92 |
| 2 | 151.39 |
| 3 | 152.19 |
| 4 | 153.30 |
| 5 | 154.74 |
| 5.5 | 155.57 |
| 6.0 | 156.49 |
| 6.5 | 157.49 |
| 7.0 | 158.57 |
| 7.5 | 159.72 |
| 8.0 | 160.97 |
| 8.5 | 162.29 |
| 9.0 | 163.69 |
| 9.5 | 165.18 |
| 10.0 | 166.75 |

It will be noted that since the $$\frac{\sin x}{x^\circ}$$

is less than $$\frac{\pi}{180}$$

and the $$\frac{\tan x}{x^\circ}$$

is greater than $$\frac{\pi}{180}$$

the limiting value $$\frac{\pi}{180}$$

for 0° will yield a common zero marker for both scales. In this way the differential sin scale is graduated in a preferred embodiment to the left (counterclockwise) of this common zero marker whereas the differential tan scale is graduated to the right (clockwise) of this marker.

Utilizing the slide rule of FIGURE 1 having the improvement thereon of the differential sin and tan scales 21 and 31 of FIGURE 2 of the present invention, the sin of angle may be found to an accuracy of five significant figures by the following procedure: To find the sin of 4.37°, (a) set the inner arm 24 on register and the outer arm 34 on 437 of the (logarithmic) number scale 54, noting the index 0.64 on the outer arm where its hairline intersects the guide line of the scale 54 at the number 437, (b) move the two arms as a unit—without changing the angular relationship between them—until the inner arm 24 indicates 4.37° on the differential sin scale 21, (c) and, at the sum, 0.88, of the index of 0.64 and 0.24, the index of the differential sine scale (at 0.88=0.64+0.24) read sin 4.27°=0.076195 from scale 54 by means of the hairline on the outer arm 34. The decimal point was set from the knowledge that sin 4.37° lies between sin 5.75°, which is approximately 0.1 and sin 0.575°, which is approximately 0.01. With this same setting one may also read the log sin 437° taking the last four figures 8193 of the mantissa, .88193, from the scale 46, the first figure, 8, of the mantissa from the first figure of the index 0.88; the characteristic 8. . . .—10 is determined from the decimal point in sin 4.37°. Moreover, sin 4.37°=0.076197 may be read from the number scale 54 or may be used as a setting for a continuation computation. This procedure of finding or setting the sine of an angle may be used either at the beginning or internally in a sequence of computations.

The computational procedure may be varied to perform both multiplications and divisions by the angles of the scale. Returning to the previous example, follow step (a) as given above, to read tan 4.37°, then shift the two arms 24 and 34 as a unit without changing the angle between them until the lower arm 24 is on 4.37° of the differential tan scale and read tan 4.37°=0.076423 or log tan 4.37°=8.88323−10. It is to be noted that both the sine and tangent can be read for a given angle with a single setting of the angular relation of the arms as in (a) above.

To multiply by the sine of an angle, for instance, 8.32× sin 4.37°, proceed formally exactly as for an ordinary multiplication of three factors $$8.32\times 437\times S(4.37°)=0.63396$$

where S(4.37°) represents 4.37° on the differential sine scale. The index 0.24 is used for the third factor and the decimal point of the (original) product is set from knowing that sin 4.37° is between 0.01 and 0.1.

When the value of sin $x$ is given, the formal quotient of this value (set on the number scale 54) by the zero angle on the differential sin scale 20 yields a rough approximation to $x°$ to be read on the number scale 54. A second formal division of sin $x$ on the scale 54 by the roughly determined angle $x°$ on the differential sine scale yields a reasonably accurate second approximation of the value of $x°$ to be read from the scale 54. The same procedure would be followed using the differential tan scale when the tangent of the angle is given.

It was found more convenient, however, to establish a differential arc sin scale 31 and a differential arc tan scale 35 to perform the conversion in the opposite direction. These differential arc function scales eliminate the operation of having to determine the approximate values of the angle. Since $$\frac{x°}{\sin x}$$

is determinable from the value of sin $x$, a multiplication of $$\frac{x°}{\sin x}$$

by sin $x$ will yield the value of $x°$, the desired angle in degrees. To perform this conversion from sin $x$ to $x°$ it suffices in the illustrated embodiment to construct a scale whose layout angle is given by $$\text{layout angle } \theta°=360+\left(\log_{10}\frac{x°}{\sin x}-1.80000\right)3600$$

Graduations on this scale will be preferentially for values of sin $x$ from 0.00 to 0.20 as follows:

| sin $x$ | $\theta°$ |
|---|---|
| 0.00 | 209.24 |
| 0.01 | 209.27 |
| 0.02 | 209.35 |
| 0.03 | 209.48 |
| 0.04 | 209.66 |
| 0.05 | 209.89 |
| 0.06 | 210.18 |
| 0.07 | 210.52 |
| 0.08 | 210.91 |
| 0.09 | 211.36 |
| 0.10 | 211.86 |
| 0.11 | 212.41 |
| 0.12 | 213.02 |
| 0.13 | 213.67 |
| 0.14 | 214.39 |
| 0.15 | 215.15 |
| 0.16 | 215.97 |
| 0.17 | 216.85 |
| 0.18 | 217.79 |
| 0.19 | 218.78 |
| 0.20 | 219.82 |

and labeled according to these values (not according to values of $x$). For sin $x$=0.00 the graduation is at the limiting position $\theta$=209.24°, the angle for $$\frac{180°}{\omega}$$

on the log number scale.

The layout angle for the differential arc tan scale will be given in degrees by $$\text{layout angle } \theta°=360+\left(\log_{10}\frac{x°}{\tan x}-1.80000\right)3600$$

The scale is graduated according to values of tan $x$ and has the same graduation for tan $x$=0.00 as the differential arc sin scale has for $x$=0.00. The other graduations will preferentially be for the following values of tan $x$:

| tan $x$ | $\theta°$ |
|---|---|
| 0.00 | 209.24 |
| 0.01 | 209.19 |
| 0.02 | 209.03 |
| 0.03 | 208.77 |
| 0.04 | 208.40 |
| 0.05 | 207.94 |
| 0.06 | 207.37 |
| 0.07 | 206.69 |
| 0.08 | 205.92 |
| 0.09 | 205.03 |
| 0.10 | 204.05 |
| 0.11 | 202.97 |
| 0.12 | 201.78 |
| 0.13 | 200.50 |
| 0.14 | 199.11 |
| 0.15 | 197.63 |
| 0.16 | 196.05 |
| 0.17 | 194.36 |
| 0.18 | 192.59 |
| 0.19 | 190.71 |
| 0.20 | 188.75 |

and labeled according to these values. As in the case of the differential sin and tan scales, these also extend in opposite directions from their common zero graduation.

By observation of the four computed tables of layout angles, it may be seen that the differential sin and tangent scale together occupy on the order of 24° on a single turn for angles $x$ between 0° and 10° and that the differential arc sin and arc tangent scales together occupy approximately 31° on a single turn for tan $x$ and sin $x$ between 0.00 and 0.20.

To utilize the (differential) arc sin scale 31 or the (differential) arc tan scale 35 in converting to an angle, the following procedure would be followed: To determine the angle $x°$ whose tangent is 0.023561, (a) set the inner arm 24 on register and the outer arm 34 on 23561 of the number scale 54 at index 0.37, (b) move the two arms 23 and 34 as a unit without changing the angle therebetween until the inner arm hairline is at 0.023561 on the arc tan 35 scale, (c) read $x°$=1.3497° at the index 1.13 (or 0.13) which is the sum of the index 0.76 of the arc tan scale and the index 0.37 of 0.023561. (Integers may be dropped in adding indices when reading from logarithmic scale 54.) The decimal point is set by the knowledge that the angle is between 5.75° and 0.575°, since the value of the tangent is between 0.01 and 0.1.

A similar procedure is used to convert from the sine of the angle to the angle using the arc sine scale.

To find the angle which arises as the sin or tangent of an angle computed from a formula, for example, $$\tan x=\frac{0.892}{14.630}$$

the division is performed in the customary way, noting that the value of the quotient is 0.060971 and then performing the conversion as before. Note that it is not necessary to reset the value of tan $x$, the quotient, nor to register the inner arm, since the quotient is read or set when this arm is in register. On the rule, (a) shift the two arms as a unit keeping their angular relationship fixed until the hairline on the previously registered arm is at 0.061 on the differential arc tan scale, (b) read the angle $x°=3.04890°$ from the hairline on the second arm at the index 1.54 (or 0.54), the sum of the index 0.78 of the quotient 0.06 and the index 0.76 of the arc tan scale.

Although these four differential scales are here illustrated as lying on circular arcs near the periphery of the circular disc, the positions of these scales on the rule need not be so limited. The only requirement in positioning the scales is that the radial lines through the graduations assume the same angular relations with the register as shown in FIGURE 1. Or alternatively, similar scales may be placed on the arms rather than on the disc and to be used in conjunction with two individual marks at only $$\log_{10} \frac{\pi}{180}$$

and $$\log_{10} \frac{180}{\pi}$$

on the disc.

As described herein, the angles $x$ are measured in degrees; however, a similar set of differential scales for any other angular measure such as grads, radians, decimal fractions of a circle, etc., is within the scope of my invention. Also, some base of logarithms other than 10 may be appropriate for a pair of functions.

The illustrative embodiment shown herein extends the ranges of sines and tangents by means of a set of differential scales applied to a disc-type rule with ten-turn log number and log trigonometric scales, a similar set of scales for a circular slide rule or one for any other number of turns on either a disc, cylinder, or other surface is also within the scope of my invention. For example, the layout angles for the differential sine and tangent scales of a disc-type rule with a single cycle logarithmic number scale are given by $$\text{sin scale: layout angle } \theta° = \left(\log_{10} \frac{\sin x}{x°} + 2\right)360$$

$$\text{tan scale: layout angle } \theta° = \left(\log_{10} \frac{\tan x}{x°} + 2\right)260$$

The layout angles corresponding to the associated differential arc function scales are given by arc sin scale:

$$\text{layout angle } \theta° = \left(\log_{10} \frac{x°}{\sin x} - 1\right)360$$

$$\text{arc tan scale: layout angle } \theta° = \left(\log_{10} \frac{x°}{\tan x} - 1\right)360$$

The differential scales are described above as having been graduated on a circular slide rule. It is to be expressly understood that the principles of the present invention may be equally applied to other types of slide rule. For instance, the principles of the differential scales have been incorporated in a straight slide rule throughout the entire range of angles for the sine function extending from 0° to 90°.

When the length of one cycle of the logarithmic number scale is taken as the layout unit, the layout distances D for the graduations of the differential sine scales and differential tangent scales are given by $$\text{sin: } D = \log_{10} \frac{\sin x}{x°} + 2$$

$$\text{tan: } D = \log_{10} \frac{\tan x}{x°} + 2$$

and those for the associated differential arc sin and arc tan scales are $$\text{arc sin scale: } D = \log_{10} \frac{x°}{\sin x} - 1$$

$$\text{arc tan scale: } D = \log_{10} \frac{x°}{\tan x} - 1$$

This rule is shown in FIGURE 3. The spread of the graduations was adequate to give readings and settings of sine which could be read to three figures throughout the entire range of angles. The scale is deci-trig, and, although this rule requires an additional operation for each angle, the differential sine scale, for instance, provides the advantage over the conventional sine scale of being able to read tenths of a degree from 70° to 90° in addition to being extended to read to 0° with accuracy.

Again, it is to be expressly understood that although the above differential scales are described in conjunction with trigonometric scales, the principles of the invention are not to be limited thereto. For example, the difference of the function $\log_e \cosh x$ and the function $x$ varies from 0 to $-\log_e 2$ when $x = +\infty$. Thus brief differential scales could be constructed to read $\log_e \cosh x$ from the function $x$, i.e., the scale 46 of FIGURE 1 with equal distances between graduations.

The layout angle for the differential $\log_e \cosh$ scale, on the rule of FIGURE 1, would be given by $$\theta = (\log_e \cosh x - x)3600$$

if five significant figures are desired, or $$\theta = (\log_e \cosh x - )360$$

if four significant figures are sufficient. This latter layout angle would apply equally to a circular slide rule of the ordinary type having a single turn equal graduation scale.

The layout angle for the corresponding inverse function scales are given by $$\theta = (x - \log_e \cosh x)3600 \text{ or } (x - \log_e \cosh x)360$$

respectively. It is to be noted that for differential $\log_e \cosh x$ scale, the angles are negative, that is, laid off counterclockwise from the register and those for inverse function scale are positive and laid off clockwise from the register.

The graduations for the $\log_e \cosh x$ scale for 0° to are given as follows:

| $x$ | $\log_e \cosh x - x$ |
|---|---|
| 0 | 0.00000 |
| .1 | −0.09500 |
| .2 | −0.18013 |
| .3 | −0.25565 |
| .4 | −0.32206 |
| .5 | −0.37987 |
| .6 | −0.42986 |
| .7 | −0.47274 |
| .8 | −0.50925 |
| .9 | −0.54041 |
| 1.0 | −0.56622 |
| 1.1 | −0.58807 |
| 1.2 | −0.60630 |
| 1.3 | −0.62150 |
| 1.4 | −0.63412 |
| 1.5 | −0.64457 |
| 1.6 | −0.65320 |
| 1.7 | −0.66032 |
| 1.8 | −0.66619 |
| 1.9 | −0.67102 |
| 2.0 | −0.67500 |
| 2.1 | −0.67827 |
| 2.2 | −0.68094 |
| 2.3 | −0.68315 |
| 2.4 | −0.68495 |
| 2.5 | −0.68644 |
| 2.6 | −0.68766 |
| 2.7 | −0.68865 |
| 2.8 | −0.68946 |
| 2.9 | −0.69012 |
| 3.0 | −0.69067 |
| 4.0 | −0.69283 |
| 5.0 | −0.69312 |
| 6.0 | −0.69315 |
| 7.0 | −0.69315 |
| $\infty$ | −0.69315 |

For the ten turn type of rule shown in FIGURE 1, the fiive figures in the $\log_e \cosh x - x$ column are to be multiplied by 3600; and for the conventional circular rule by 360. In a straight slide rule the $\log_e$ cosh scale is laid out with the figures as given in table except 1 is added to shift the scale a cycle to be used in conjunction with the equal division scale.

Finally, and of primary significance, most of the above illustrations concerns two functions whose ratio varies slowly, with the consequence that the difference of their logarithms varies slowly, the same theory of construction (as shown with the $\log_e \cosh x - x$ rule) applies to any two functions whose difference varies slowly.

Other modifications and departures from the above preferred embodiments within the scope of my invention will be apparent to those skilled in the art.

What is claimed is:

1. A calculating device of the circular disc type comprising:

(A) a first spiral scale representing a first function extending from a pivot point and extending to the outer periphery of said disc;

(B) a second spiral scale juxtaposed to said first spiral scale and representing a second function;

(C) a pair of pivotly mounted arms on said disc and extending from said pivot point, at least one of said arms extending beyond the outer periphery of said disc;

(D) a first and a second auxiliary scale positioned on said disc beyond the outer turn of scale spiral scales, (1) said first auxiliary scale representing a third function having graduations laid out according to the differences of said first and third functions, (2) said second auxiliary scale representing a fourth function having graduations laid out according to the differences of said second and fourth functions;

(E) said graduations on said first and second auxiliary scale so positioned on said disc and angularly related that in determining an unknown when the first of said arms is set at register and the second of said arms is set on one of said spiral scales, and said pair of arms moved without changing the angle therebtween setting on one of said auxiliary scales the reading originally set on said spiral scale, said answer is read on said spiral scale.

2. A calculating device as set forth in claim 1 wherein said first and second spiral scales are logarithmic scales and wherein said graduations of said first and second auxiliary scale are the differences of the logarithms of said functions.

3. A calculating device as set forth in claim 1 wherein the ratio of the values of said first and third and said second and fourth functions varies slowly throughout a given range and wherein the difference of the logarithms of said two values also varies slowly throughout said range.

4. A calculating device as set forth in claim 1 wherein the graduations on said first auxiliary scale represent the sine of angles in degrees and are found by $$\text{layout angle } \theta^\circ = \left(\log_{10}\frac{\sin x}{x^\circ}1.80000\right)3600$$

5. A calculating device as set forth in claim 3 wherein the sine of the angle divided by the angle in degrees is approximately $$\frac{\pi}{180}$$

and wherein graduations of said second scale are closer angularly to $$\frac{\pi}{180}$$

of said first scale as the angle gets closer to zero.

6. A calculating device as set forth in claim 3 where the graduations on said second scale represent the tangent of angles in degrees and are found by $$\text{layout angle } \theta^\circ = \left(\log_{10}\frac{\tan x}{x^\circ}1.80000\right)3600$$

7. A calculating device as set forth in claim 5 wherein the tangent of the angle divided by the angle in degrees is approximately $$\frac{\pi}{180}$$

and wherein graduations of said second scale are closer angularly to $$\frac{\pi}{180}$$

of said first scale as the angle gets closer to zero.

8. A calculating device as set forth in claim 1 wherein said first function represents angle in degrees and said third function represents the sine of angles in degrees; and said second function represents angle in degrees and said fourth function represents the tangent of angles in degrees.

References Cited by the Examiner

UNITED STATES PATENTS

| | | | |
|---|---|---|---|
| 1,488,686 | 4/24 | Keuffel | 235—70 |
| 2,564,227 | 8/51 | Pepper | 235—67 |

OTHER REFERENCES

Jenkins, Lewis A.: Design of Special Slide Rules I, Industrial Management, vol. 54, November 1917, pages 241–248.

Jenkins, Lewis A.: Design of Special Slide Rules II, Industrial Management, December 1917, pages 384–389.

LEO SMILOW, *Primary Examiner.*

UNITED STATES PATENT OFFICE
CERTIFICATE OF CORRECTION

Patent No. 3,202,352 August 24, 1965

Paul M. Pepper

It is hereby certified that error appears in the above numbered patent requiring correction and that the said Letters Patent should read as corrected below.

Column 4, line 68, strike out "sin", second occurrence, and insert the same before "4.37°" in line 69, same column 4; column 6, lines 5 and 6, for $$\frac{180°}{\omega} \quad \text{read} \quad \frac{180°}{\pi}$$

same column 6, line 53, for "31" read -- 35 --; lines 54 and 61, for "35", each occurrence, read -- 25 --; lines 61 and 63, before "arc", each occurrence, insert -- differential --; column 7, line 50, for "260" read -- 360 --; column 8, line 31, for "$\theta=(\log_e \cosh x-)360$" read -- $\theta=(\log_e \cosh x-x)360$ --; line 45, after "to" insert -- 7.0° --; column 10, lines 5 and 6, and lines 24 and 25, before "1.80000", each occurrence, insert -- + --.

Signed and sealed this 14th day of June 1966.

(SEAL)
Attest:

ERNEST W. SWIDER
Attesting Officer

EDWARD J. BRENNER
Commissioner of Patents